(12) United States Patent
Higa et al.

(10) Patent No.: US 9,510,037 B2
(45) Date of Patent: Nov. 29, 2016

(54) MEDIA SERVICE PERSONALIZATION SYSTEMS AND METHODS

(71) Applicant: Verizon Patent and Licensing Inc., Arlington, VA (US)

(72) Inventors: George M. Higa, Plano, TX (US); Deron Bauman, Dallas, TX (US); Lilian Mi Quach, Grand Prairie, TX (US); Hao Tzu Kong, Allen, TX (US); Sherrily Huang, Plano, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1 day.

(21) Appl. No.: 14/265,056

(22) Filed: Apr. 29, 2014

(65) Prior Publication Data
US 2015/0312608 A1    Oct. 29, 2015

(51) Int. Cl.
| | |
|---|---|
| H04N 21/2668 | (2011.01) |
| H04N 21/45 | (2011.01) |
| H04N 21/442 | (2011.01) |
| H04N 21/466 | (2011.01) |
| H04N 21/422 | (2011.01) |
| H04N 21/482 | (2011.01) |
| H04N 21/258 | (2011.01) |

(52) U.S. Cl.
CPC .... *H04N 21/2668* (2013.01); *H04N 21/25891* (2013.01); *H04N 21/42225* (2013.01); *H04N 21/44222* (2013.01); *H04N 21/4532* (2013.01); *H04N 21/4667* (2013.01); *H04N 21/4668* (2013.01); *H04N 21/4826* (2013.01)

(58) Field of Classification Search
CPC ............... H04N 21/258; H04N 21/25808; H04N 21/25816; H04N 21/25866; H04N 21/25891; H04N 21/422; H04N 21/42204; H04N 21/42219; H04N 21/4222; H04N 21/436; H04N 21/4532; H04N 21/466; H04N 21/472; H04N 21/482; H04N 21/4826; H04N 21/4126
See application file for complete search history.

(56) References Cited

U.S. PATENT DOCUMENTS

| | | | | |
|---|---|---|---|---|
| 8,924,999 | B1 * | 12/2014 | Santangelo ...... | H04N 21/25875 725/10 |
| 2012/0090007 | A1 * | 4/2012 | Xiao et al. ...................... | 725/46 |
| 2013/0097626 | A1 * | 4/2013 | Rajagopal .......... | H04N 21/2541 725/25 |
| 2014/0168071 | A1 * | 6/2014 | Ahmed .............. | H04N 5/23206 345/156 |

* cited by examiner

*Primary Examiner* — John Schnurr

(57) ABSTRACT

In an exemplary method, a media service personalization system directs a media service access device to operate in accordance with a shared mode of operation when user interaction with the media service access device is by way of a shared user input device and directs the media service access device to operate in accordance with a personal mode of operation when user interaction with the media service access device is by way of a personal device specific to a user. In certain examples, the media service personalization system may switch between directing the media service access device to operate in accordance with the shared mode of operation and directing the media service access device to operate in accordance with the personal mode of operation based on a status of a remote control session between the personal device and the shared media service access device.

18 Claims, 12 Drawing Sheets

MEDIA SERVICE PERSONALIZATION SYSTEMS AND METHODS

BACKGROUND INFORMATION

A media service, such as a subscriber television service, provides end users of the service with access to media content. An end user typically interacts with the service by way of a media service access device to discover and access features of the media service and/or media content that is accessible through the media service.

A provider of a media service may want to personalize the media service to a specific end user in a manner that facilitates a personalized experience with the media service. Such personalization can be challenging, however, when a media service access device shared by multiple users is used to access the media service. For example, a set-top box device may be shared by members of a household, making it difficult to determine which of the members of the household is using the set-top box device at a given time. The uncertainty about which user is currently interacting with the set-top box device has created difficulty for accurate personalization of the media service to a specific user.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary media service personalization systems and methods are described herein. Systems and methods described herein may selectively personalize a media service to an end user of the media service based on how user input to interact with a shared media service access device is received. For example, systems and methods described herein may direct the shared media service access device to selectively operate in accordance with either a "shared" mode of operation or a "personal" mode of operation based on how user input to interact with the media service access device is received. In certain examples, for instance, systems and methods described herein may direct the media service access device to operate in accordance with the shared mode of operation when user interaction with the media service access device is by way of a shared user input device (e.g., a shared remote control device) and may direct the media service access device to operate in accordance with the personal mode of operation to personalize the media service to a specific user when user interaction with the media service access device is by way of a personal device specific to the user.

Systems and methods described herein may provide accurate and convenient selective personalization of a media service to an end user of the media service. Additional or alternative benefits that may be provided by one or more of the exemplary systems and methods described herein will be made apparent herein. Exemplary media service personalization systems and methods will now be described in reference to the drawings.

Figure 1:
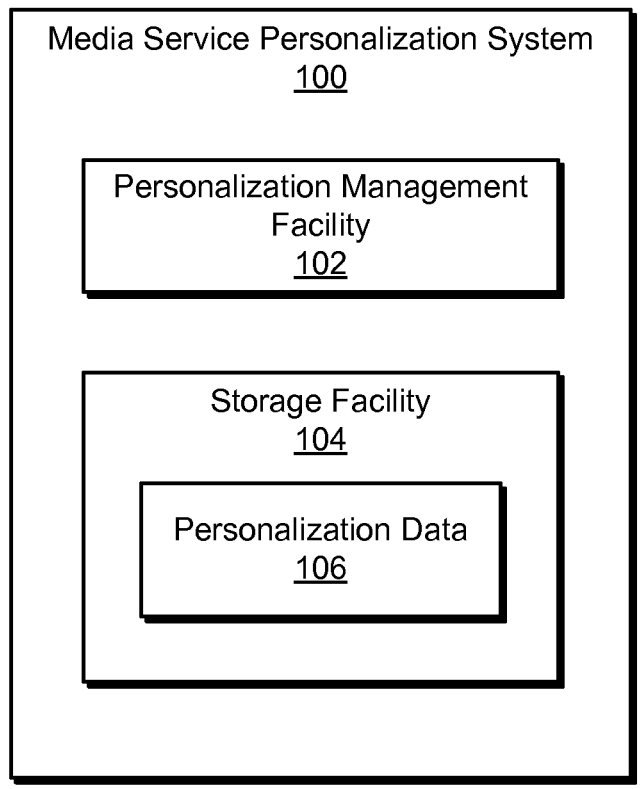
FIG. 1 illustrates an exemplary media service personalization system according to principles described herein.

FIG. 1 illustrates an exemplary media service personalization system 100 ("system 100"). System 100 may be configured to selectively personalize a media service to an end user of the media service, as described herein. As shown in FIG. 1, system 100 may include, without limitation, a personalization management facility 102 ("personalization facility 102") and a storage facility 104 selectively and communicatively coupled to one another. Any suitable communication technologies may be employed to facilitate communications between facilities 102-104.

Although facilities 102-104 are shown to be separate facilities in FIG. 1, those facilities 102-104 may be combined into a single facility or split into additional facilities as may serve a particular implementation. Additionally or alternatively, storage facility 104 may be omitted from and external to system 100 in certain alternative implementations. Facilities 102-104 of system 100 may include or be otherwise implemented by one or more computing devices configured to perform one or more of the operations described herein. Facilities 102-104 will now be described in more detail.

Personalization facility 102 may be configured to determine when to personalize a media service to a specific user and/or when to refrain from personalizing the media service to a specific user, based on how user input to interact with a shared media service access device is received. Personalization facility 102 may be configured to make such determinations in any suitable way, including in any of the exemplary ways described herein. For example, personalization facility 102 may be configured to detect when user interaction with the shared media service access device is received by way of a shared user input device and when user interaction with the shared media service access device is received by way of a personal device specific to the user and, based on the detected user interactions, determine when to personalize or to refrain from personalizing the media service to the user.

In certain examples, based on detected user interactions with the shared media service access device, personalization facility 102 may determine whether a remote control session between the shared media service access device and a personal device specific to a user is active or inactive and, based on the status of the remote control session, determine whether to personalize or to refrain from personalizing the media service to the user. For example, personalization facility 102 may determine to personalize the media service to the user when the remote control session is active and to refrain from personalizing the media service to the user when the remote control session is inactive. Examples of personalization facility 102 determining when to personalize or refrain from personalizing the media service to a user, including examples that are based on a determined status of a remote control session, are described in more detail herein.

Based on a determination as to whether to personalize or refrain from personalizing the media service to a user, personalization facility 102 may perform one or more operations to facilitate personalization or non-personalization of the media service to the user. For example, personalization facility 102 may direct the shared media service access device to operate in accordance with either a shared mode of operation or a personal mode of operation. The shared media service access device may receive and respond to direction from personalization facility 102 by operating in accordance with either the shared mode or personal mode of operation. When operating in accordance with the shared mode of operation, the shared media service access device may refrain from personalizing the media service to a specific user. When operating in accordance with the personal mode of operation, the shared media service access device may personalize the media service to a specific user. Examples of operations to personalize and refrain from personalizing the media service to a user are described in more detail herein.

Personalization facility 102 may access and use personalization data for a user to personalize the media service to the user. The personalization data may represent any information that may be used to personalize the media service to the user. For example, the personalization data may represent information about the user, such as user settings, user preferences, user demographics, previous user interactions with the media service (e.g., a user history with the media service), and/or any other information related to the user.

In certain examples, personalization facility 102 may maintain personalization data for a user. As an example, personalization facility 102 may receive user personalization settings input by the user. As another example, personalization facility 102 may track interactions of the user with the media service and use the tracked interactions to generate and store personalization data. In certain implementations, personalization facility 102 may be configured to selectively track interactions of the user with the media service by way of a shared media service access device when the shared media service access device operates in accordance with a personal mode of operation but not when the shared media service access device operates in accordance with a shared mode of operation. Examples of such selective tracking are described in more detail herein.

Storage facility 104 may store personalization data 106 accessed, generated, maintained, and/or used by personalization facility 102. The personalization data 106 may represent personalization information for one or more end users of a media service. In certain examples, the personalization data 106 may include user profiles for end users of the media service. Storage facility 104 may maintain additional or alternative data as may serve a particular implementation.

Figure 2:
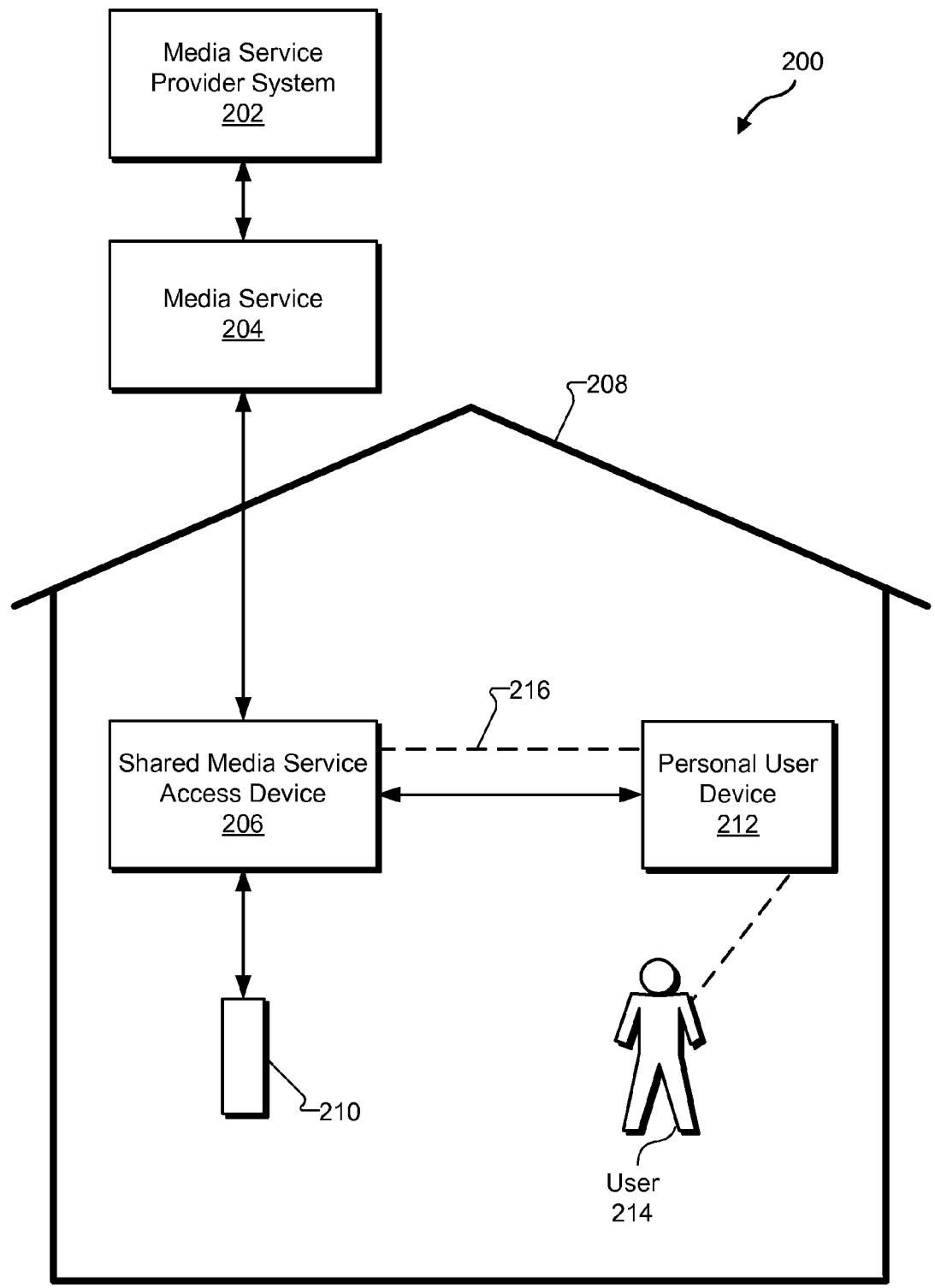
FIG. 2 illustrates an exemplary implementation of the system of FIG. 1 according to principles described herein.

FIG. 2 illustrates an exemplary implementation 200 of system 100. System 100 may be implemented in implementation 200 in any suitable way. For example, one or more facilities of system 100 (e.g., personalization facility 102) may be implemented entirely by a single element of implementation 200 or distributed across multiple elements of implementation 200.

As shown, implementation 200 may include a media service provider system 202 configured to provide a media service 204. The media service provider system 202 may include one or more computing devices (e.g., server computing devices) associated with (e.g., operated by) a provider of the media service 204 and configured to provide the media service 204 for access by one or more end users of the media service 204.

The media service 204 may include any service by way of which an end user of the service may discover, access, and/or consume media content and/or information about media content. For example, the media service 204 may include a television programming service (e.g., a subscriber television service), an on-demand media service (a video-on-demand service), a video distribution service, and/or any other service that distributes media content and/or media content information to a user.

As used herein, the term "media content" may refer to any form of media that may be distributed by way of a media service (e.g., media service 204) and consumed by an end user of the media service. Media content may include discrete instances of media, which may be referred to as media programs. The term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that a user may access by way of the media service.

The media service 204, including media content, information, features, and/or media service user interfaces of the media service, may be accessible to an end user of the media service 204 by way of one or more appropriately configured user computing devices. Such a user computing device may be referred to as a "media service access device."

A particular user computing device may be shared between multiple users. A shared user computing device may be a device that is actually, typically, or predictably shared by multiple users under normal use conditions for the device. For example, a shared media service access device may be used, in turn or concurrently, by any users in a group of multiple users. To illustrate, a set-top box device may be shared by members of a household to access the media service 204.

Another particular user computing device may be a personal user device. A personal user device may be a device that is actually, typically, or predictably used exclusively or predominantly by a single particular user. Accordingly, the personal user device may be said to be specific to the user. To illustrate, a mobile device (e.g., a mobile phone, a tablet, a wearable device, etc.) may be used exclusively or predominantly by a particular user. In certain examples, such a personal user device may be configured to access the media service 204 and may be referred to as a personal media service access device. In other examples, a personal user device may not be configured to access the media service.

In implementation 200, a shared media service access device 206 is configured to access the media service 204. Shared media service access device 206 may include any user computing device, such as a set-top box device, that is configured to access the media service 204 and that is actually, typically, or predictably shared by multiple users under normal use conditions for the device.

As shown in FIG. 2, shared media service access device 206 may be located at a customer premises 208 (e.g., a house or other premises associated with an end user of the media service 204). Accordingly, shared media service access device 206 may be actually, typically, or predictably shared by any members of a household who reside within customer premises 208 and/or other people who visit customer premises 208.

A person located within customer premises 208 may utilize a shared user input device to provide user input to interact with shared media service access device 206. The shared user input device may be any device that may be actually, typically, or predictably shared by multiple users to interact with shared media service access device 206. As an example, a shared user input device may include one or more physical and/or virtual buttons on shared media service access device 206. As another example, a shared user input device may include a shared remote control device configured to receive user input from a user and wirelessly transmit signals to shared media service access device 206 using any suitable transmission and/or signaling technologies (e.g., infrared and/or radio frequency signals). For instance, a shared remote control device may be a standard consumer electronics remote control device, such as a television remote control device. FIG. 2 shows a remote control device 210 that may be shared by multiple users and used to interact with shared media service access device 206.

When user input to interact with shared media service access device 206 is received by way of a shared user input device, such as remote control device 210, personalization facility 102 may direct shared media service access device 206 to operate in a shared mode of operation to refrain from personalizing the media service 204 to a specific user. Examples of such operations are described in detail herein.

As further shown in FIG. 2, a personal user device 212 that is specific to a user 214 may communicate with shared media service access device 206. Personal user device 212 may be any device that is actually, typically, or predictably used exclusively or predominantly by user 214, or is otherwise identified by personalization facility 102 as having a relationship specific to the user. For example, personal user device 212 may be a mobile device (e.g., a mobile phone, a tablet, a wearable device, etc.) used exclusively or predominantly by user 214.

Personal user device 212 may be configured to communicate with shared media service access device 206 using any suitable communication technologies. For example, personal user device 212 may communicate with shared media service access device 206 using direct wireless communications such as Bluetooth communications, radio frequency communications ("RF"), near field communications ("NFC"), etc. Additionally or alternatively, personal user device 212 may communicate with shared media service access device 206 using indirect wireless communications such as communications sent over a wireless network (e.g., a local area network such as a Wi-Fi network, a personal area network, a wide area network, or any combination or sub-combination thereof).

Personal user device 212 may be configured to be used by user 214 to provide user input to shared media service access device 206. For example, through personal user device 212, user 214 may provide input to interact with shared media service access device 206 to remotely control one or more operations of shared media service access device 206. To this end, personal user device 212 may be configured, in any suitable way, to function as a personal remote control device for shared media service access device 206. In certain examples, for instance, computing instructions such as a software application (e.g., a "mobile app"), which may be provided by a provider of media service 204, may be installed and run on personal user device 212 to configure personal user device 212 to function as a personal remote control device for shared media service access device 206.

As mentioned, in certain examples, personalization facility 102 may determine whether a remote control session between a shared media service access device and a personal device specific to a user is active or inactive and, based on the status of the remote control session, determine whether to personalize or to refrain from personalizing the media service to the user. To this end, personalization facility 102 may be configured to detect certain events, such as certain interactions between personal user device 212 and shared media service access device 206, and, based on the detected events, determine a status of a remote control session between personal user device 212 and shared media service access device 206. This may include personalization facility 102 identifying a start and/or an end of a remote control session between personal user device 212 and shared media service access device 206.

A remote control session may be defined to start as may suit a particular implementation. For example, one or more events may be predefined to indicate a start of a remote control session. Examples of events that may be defined to indicate a start of a remote control session may include, without limitation, a launch of a remote control application on personal user device 212, an establishment of a communication connection between a remote control application on personal user device 212 and shared media service access device 206, a request from personal user device 212 to shared media service access device 206 to establish a remote control session, communications between personal user device 212 and shared media service access device 206 to establish a communication connection and/or a remote control session, a transmission of a remote control command from personal user device 212 to shared media service access device 206, receipt by personal user device 212 of user input to interact with shared media service access device 206, and/or any combination or sub-combination of such events.

A remote control session may be defined to end as may suit a particular implementation. For example, one or more events may be predefined to indicate an end of a remote control session. Examples of events that may be defined to indicate an end of a remote control session may include, without limitation, a session timeout (e.g., an expiration of the remote control session based on a lack of user interaction with shared media service access device 206 by way of personal user device 212 for a predefined length of time), a user interface timeout (e.g., an expiration of a display of a particular user interface view, such as an expiration of a menu view followed by a reversion from the menu view to another user interface view such as a video playback view), a detected change in geographic location of personal user device 212 relative to shared media service access device 206 (e.g., personal user device 212 being moved out of customer premises 208, out of the same room in which shared media service access device 206 is located, outside of a predefined vicinity of shared media service access device 206, etc.), a detected loss of communication between personal user device 212 and shared media service access device 206 (e.g., when personal user device 212 is moved out of communication range with shared media service access device 206), a closing of a remote control application on personal user device 212, an tear down of a communication connection between a remote control application on personal user device 212 and shared media service access device 206, a request transmitted from personal user device 212 to shared media service access device 206 to end a remote control session, communications between personal user device 212 and shared media service access device 206 to tear down a communication connection and/or a remote control session, a start of a different remote control session between shared media service access device 206 and a different personal user device, a start of a remote control session between shared media service access device 206 and a shared user input device such as shared remote control device 210, receipt of user input to interact with shared media service access device 206 by way of a shared use input device such as shared remote control device 210, and/or any combination or sub-combination of such events.

Based on any suitable predefined start and end parameters for a remote control session, personalization facility 102 may determine a status of a remote control session between personal user device 212 and shared media service access device 206. This may include determining whether such a remote control session is active or inactive. FIG. 2 represents a remote control session 216 that may exist between personal user device 212 and shared media service access device 206.

When user input to interact with shared media service access device 206 is received by way of a personal user device, such as personal user device 212, personalization facility 102 may direct shared media service access device 206 to operate in a personal mode of operation to personalize the media service 204 to a specific user, such as user 214. For example, personalization facility 102 may determine to personalize the media service 204 to user 214 when remote control session 216 is active and to refrain from personalizing the media service 204 to user 214 when remote control session 216 is inactive.

In certain examples, personalization facility 102 may switch back and forth between directing operation in accordance with a personal mode of operation and directing operation in accordance with a shared mode of operation. For example, in response to a detected start of a remote control session between personal user device 212 and shared media service access device 206, personalization facility 102 may switch from directing shared media service access device 206 to operate in accordance with the shared mode of operation to directing shared media service access device 206 to operate in accordance with the personal mode of operation. Conversely, in response to a detected end of a remote control session between personal user device 212 and shared media service access device 206, personalization facility 102 may switch from directing shared media service access device 206 to operate in accordance with the personal mode of operation to (e.g., back to) directing shared media service access device 206 to operate in accordance with the shared mode of operation.

Examples of operations that may be performed to personalize and/or to refrain from personalizing a media service to a specific user will now be described in additional detail. Personalization facility 102 may perform and/or direct performance of such operations, such as by directing media service provider system 202, shared media service access device 206, and/or personal user device 212 to perform any of the operations to personalize and/or to refrain from personalizing media service 204 to a specific user. Certain examples are described herein in terms of personalization facility 102 performing certain operations and/or directing shared media service access device 206 to perform certain operations. This is illustrative only. Personalization facility 102 may direct any of media service provider system 202, shared media service access device 206, personal user device 212, and/or another computing device to perform one or more operations to personalize or to refrain from personalizing media service 204 to a specific user.

In certain examples, personalization facility 102 may personalize and/or refrain from personalizing media service 204 by personalizing a media service user interface and/or refraining from personalizing a media service user interface through which the media service 204 is accessed. For example, personalization facility 102 may direct shared media service access device 206 to operate in accordance with a shared mode of operation to provide a media service user interface that is not personalized to a specific user. Alternatively, personalization facility 102 may direct shared media service access device 206 to operate in accordance with a personal mode of operation to provide a media service user interface that is personalized to a specific user.

Figure 3:
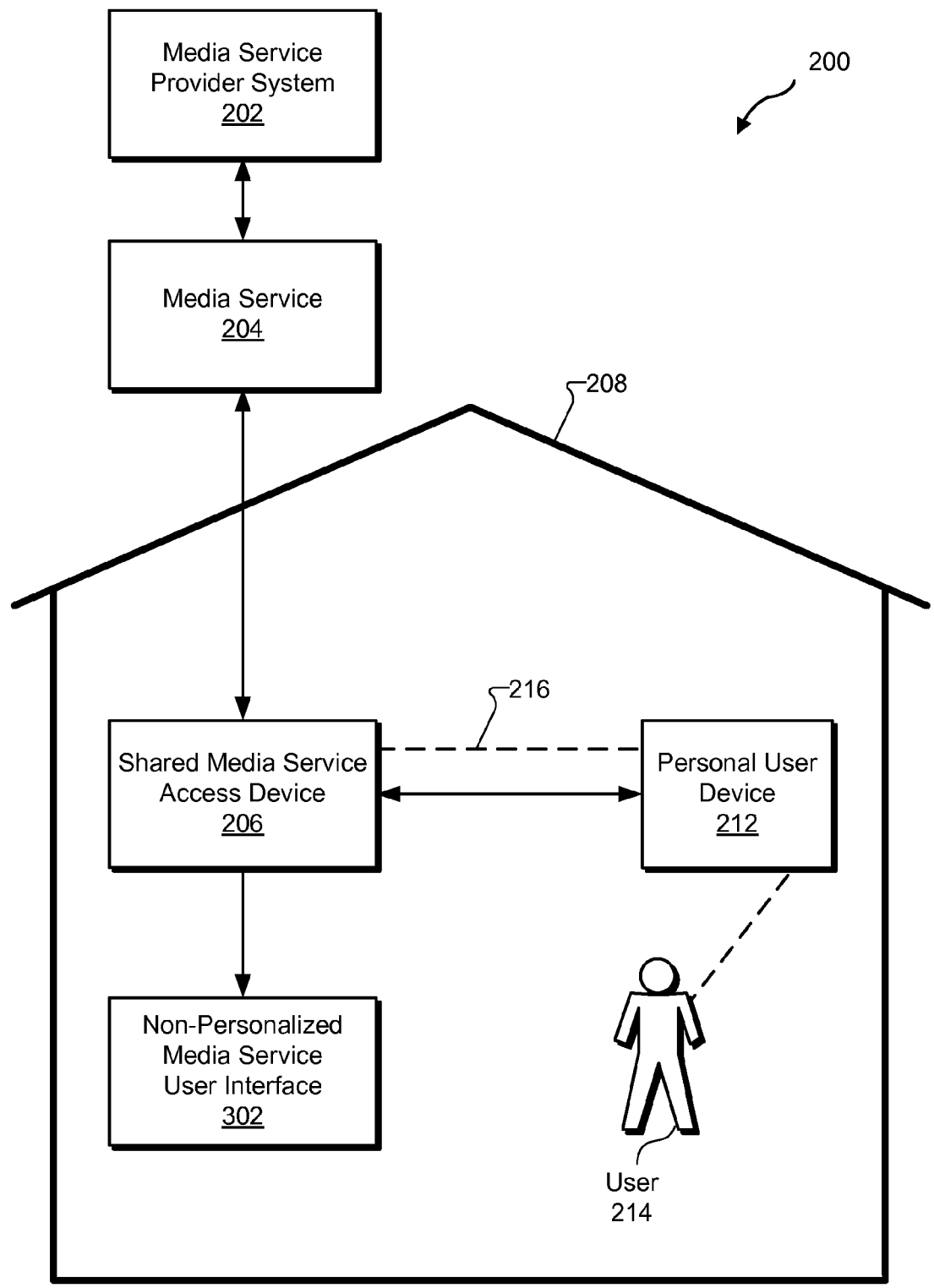
FIGS. 3-4 illustrate examples of a shared media service access device providing different media service user interfaces according to principles described herein.
Figure 4:
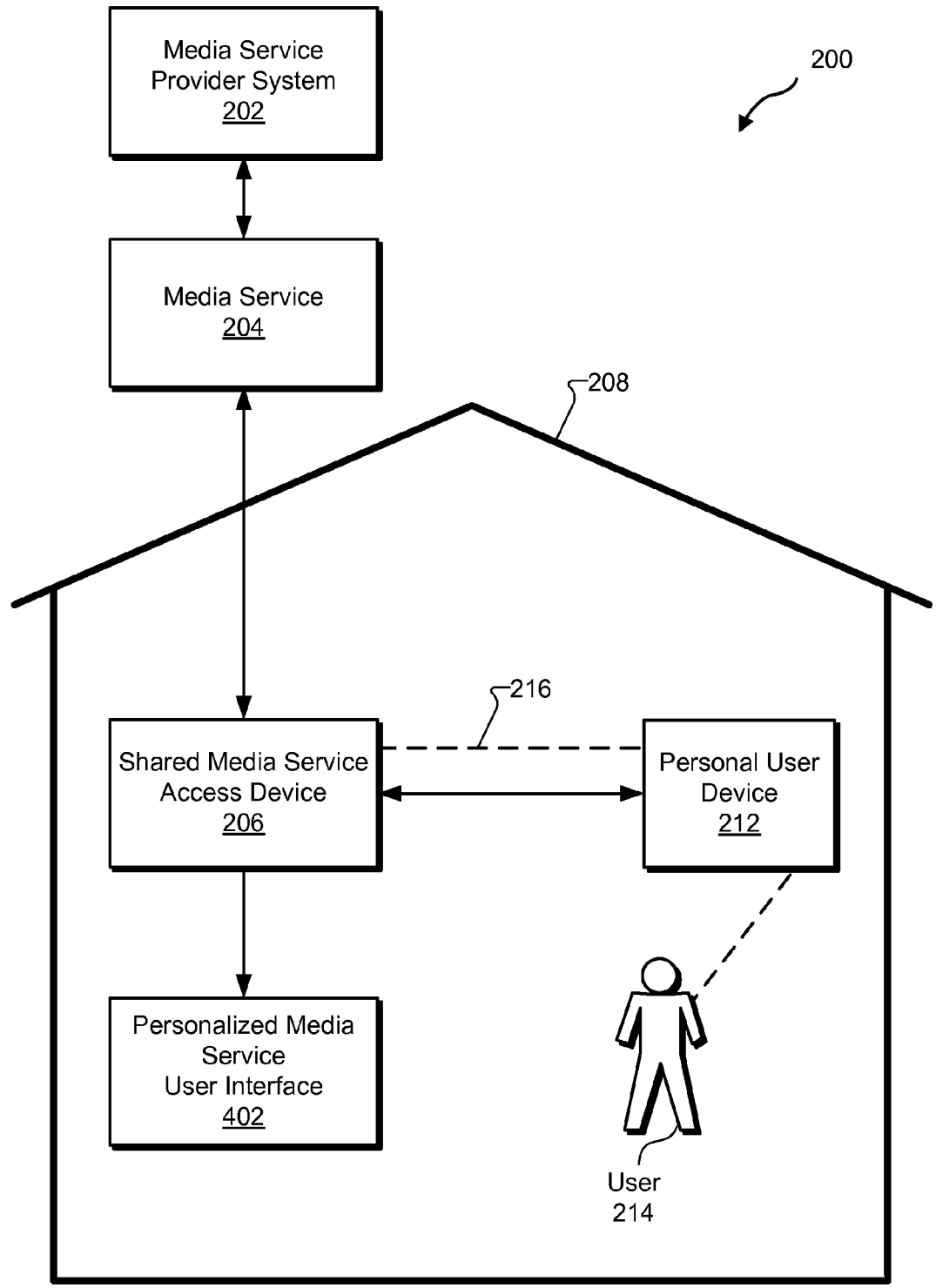

FIG. 3 illustrates an example of shared media service access device 206 providing a non-personalized media service user interface 302 during operation of shared media service access device 206 in accordance with a shared mode of operation, such as may be the case when remote control session 216 is inactive. FIG. 4 illustrates an example of shared media service access device 206 providing a personalized media service user interface 402 during operation of shared media service access device 206 in accordance with a personal mode of operation, such as may be the case when remote control session 216 is active.

A media service user interface may be personalized or not personalized to a specific user in any suitable way. For example, a media service user interface may be personalized to a specific user by being populated with user interface content that is selected for inclusion in the media service user interface based on personalization data for the user. Conversely, a media service user interface may not be personalized to a specific user by not being populated with user interface content that is selected for inclusion in the media service user interface based on personalization data for the user.

In certain examples, a media service user interface may include a graphical user interface that may be provided by shared media service access device 206 for display on a display screen of a display device (e.g., a television or computer monitor device communicatively coupled to shared media service access device 206 or a display device integrated within shared media service access device 206). Accordingly, non-personalized media service user interface 302 may include a non-personalized graphical user interface (e.g., a non-personalized graphical user interface view), and personalized media service user interface 402 may include a personalized graphical user interface (e.g., a personalized graphical user interface view).

Figure 5:
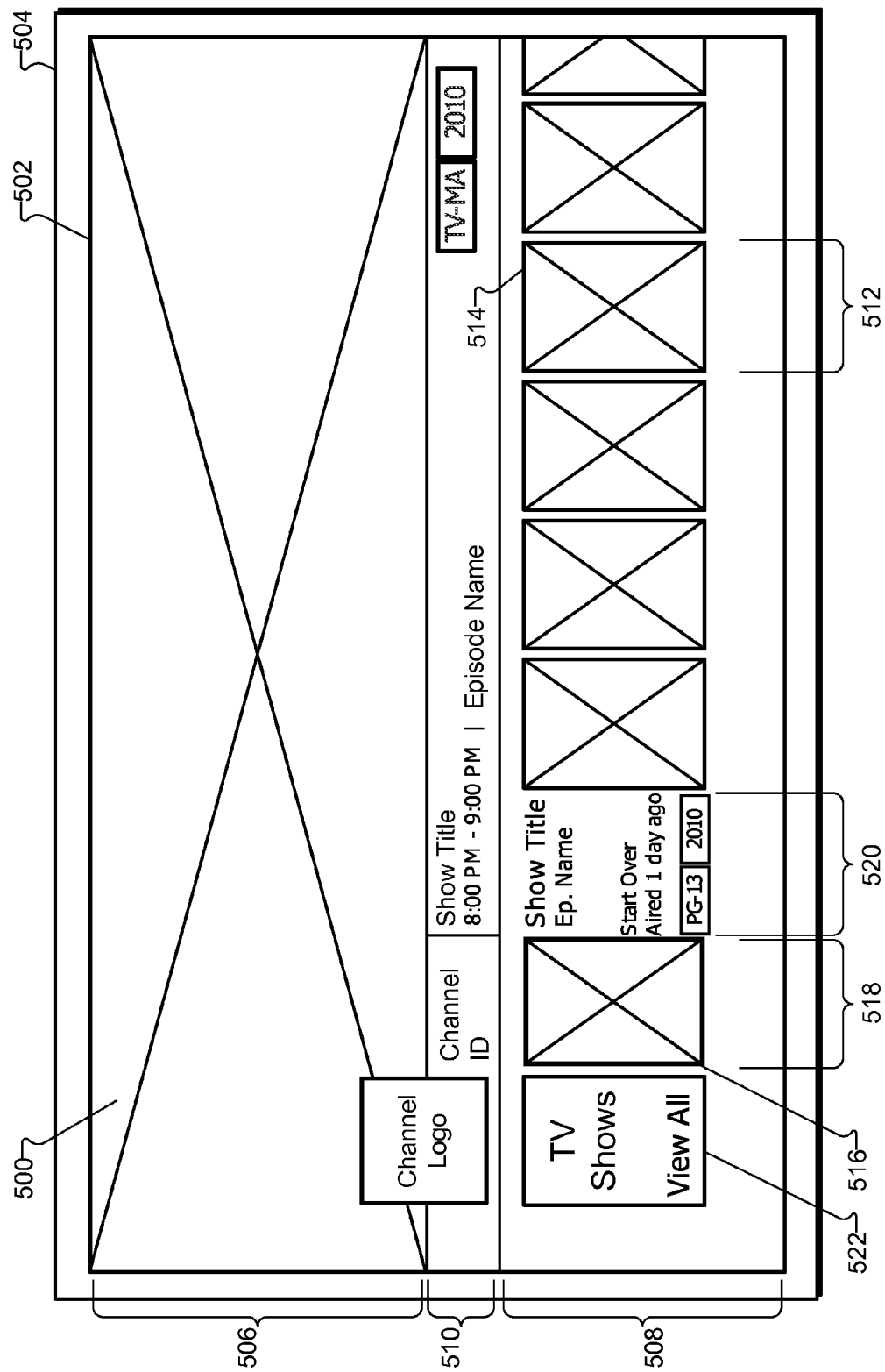
FIGS. 5-6 illustrate examples of media service user interface views according to principles described herein.
Figure 6:
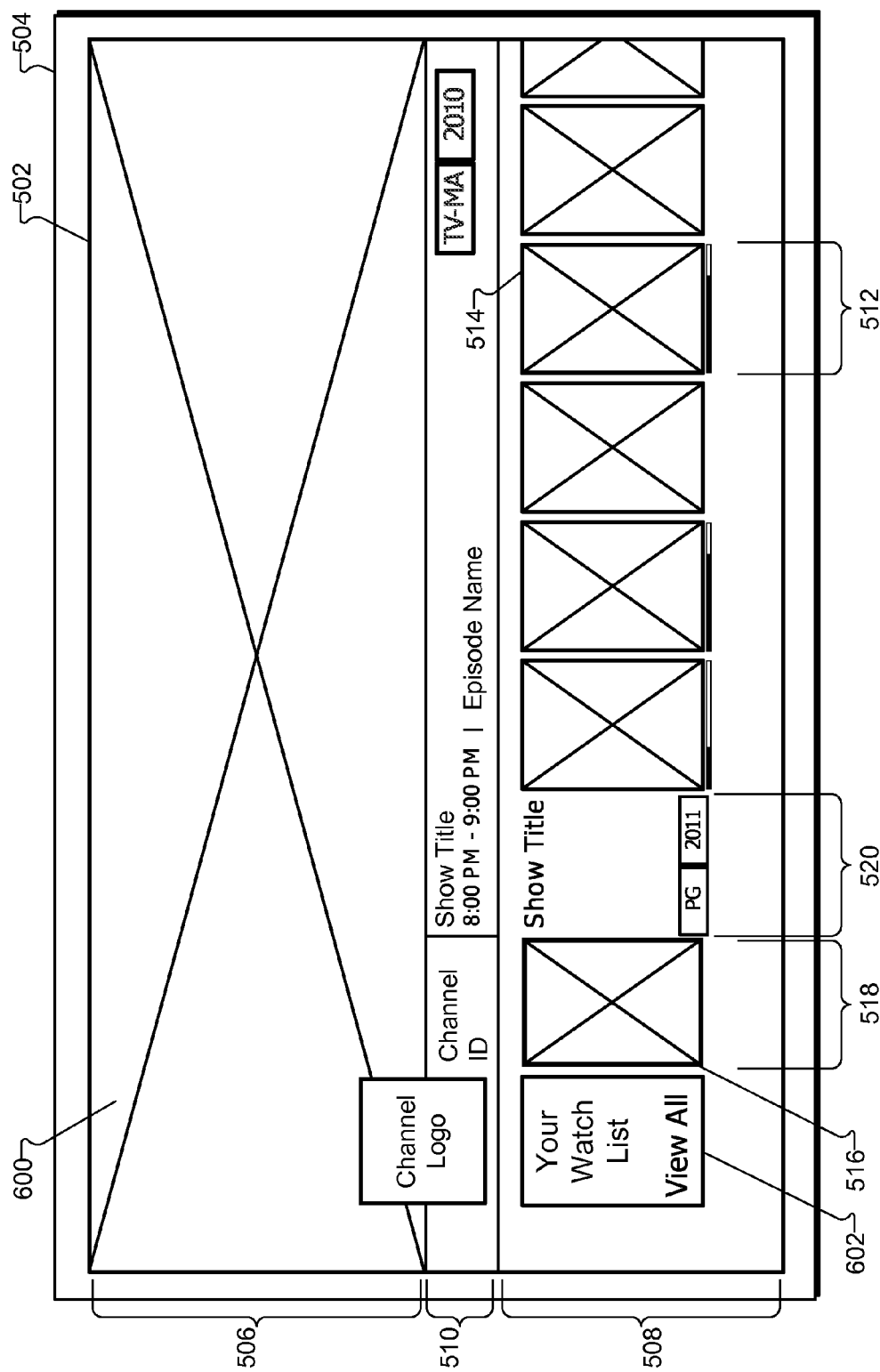

To illustrate an example of a way that a media service user interface may be personalized or not personalized to a specific user, FIGS. 5-6 show examples of views of a graphical user interface ("GUI") that may be personalized or not personalized to a specific user. FIG. 5 shows a GUI view 500 that is displayed on a display screen 502 of a display device 504 and that is not personalized to a specific user. FIG. 6 shows a GUI view 600 that is displayed on display screen 502 of display device 504 and that is personalized to a specific user.

As shown in FIG. 5, GUI view 500 may include a media menu tray user interface view in which main user interface content 506 ("main content 506") is displayed on a first portion of display screen 502, a media menu tray 508 is displayed on a second portion of display screen 502, and main content information 510 is displayed on a third portion of display screen 502 disposed between the main content 506 and the media menu tray 508.

The main content 506 may include any type of user interface content. In certain examples, the main content 506 may include video content being played back on the first portion of display screen 502. Accordingly, the GUI view 500 may include a partial-screen playback of video content.

Main content information 510 may include any information related to the main content 506. For example, when the main content 506 includes video content being played back, main content information 510 may include information about a programming channel on which the video content is distributed, a title of the video content, a time slot within which the video content is distributed in accordance with a predefined distribution schedule, a release date of the video content, a rating of the video content, and/or any other information about the video content.

Media menu tray 508 may include media menu tray user interface content representing a media program menu. For example, media menu tray 508 may include a set of one or more user-selectable graphical objects (e.g., cover art thumbnail images) representing a menu of one or more media programs. The graphical objects may be arranged in any suitable configuration. For example, the graphical objects may be arranged in a single horizontal row as shown. As another example, the graphical objects may be arranged in a two-dimensional matrix grid that includes multiple rows (e.g., media program category rows) and/or columns of graphical objects. One or more rows of the grid may be presented at a time within media menu tray 508. For instance, one row at a time may be displayed within media menu tray 508, and user input may be provided by a user to select which of the rows is displayed in the media menu tray 508.

Each graphical object in the media program menu may represent a media program and may indicate information about the media program. For example, a graphical object 512 may include a cover art image 514 for a media program (the cover art represented by two crossing diagonal lines extending between opposite corners of a rectangle).

Media menu tray 508 may include a selector object 516 configured to be moved in accordance with user input to highlight a graphical object within a set of graphical objects representing a menu of media programs. In FIG. 5, selector object 516 is positioned to highlight a particular graphical object 518. When a graphical object is highlighted by selector object 516, additional information about the media program represented by the highlighted graphical object may be inserted in media menu tray 508. For example, FIG. 5 shows media menu tray 508 to include additional information 520 about the media program. In the illustrated example, the additional information 520 includes the title of the media program, the episode name of the media program, a rating for the media program, and a release date of the media program. The additional information 520 may also indicate information about distribution of the media program, such as information indicating when the media program was last distributed (e.g., "Aired 1 day ago") or is scheduled to be distributed (e.g., "Starts in 1 hour"), and/or any other information about the media program.

In certain examples, a menu of media programs represented in media menu tray 508 may include a category-based collection of media programs, such as a collection of media programs selected from a particular category of media programs. A category of media programs (i.e., a media program category) may include any category into which media programs may be grouped based on one or more common attributes of the media programs.

In certain examples, each category of media programs may be associated with a different media distribution platform by way of which media programs are distributed and/or accessible. For example, a category of media programs may represent media programs distributed in accordance with a media-provider-defined media program distribution schedule (e.g., television programs distributed in accordance with a television programming schedule). Such a category may be referred to as a category of "scheduled-type" media programs. Another category of media programs may represent recorded media programs accessible by way of a digital video recorder ("DVR") device (e.g., a personal DVR device at a customer premises). Such a category may be referred to as a category of "recorded-type" media programs. Another category of media programs may represent media programs that are accessible on-demand (e.g., from an on-demand media distribution platform). Such a category may be referred to as a category of "on-demand-type" media programs. Another category of media programs may represent media programs that are accessible from a third-party Internet and/or World Wide Web platform and/or service (e.g., from a third-party web videos service). Such a category may be referred to as a category of "web-service-type" media programs. These examples of categories of media programs are illustrative only. Other categories of media programs may be represented in media menu tray 508 in other examples.

In certain examples, media menu tray 508 may represent a single category of media programs. In certain other examples, media menu tray 508 may represent multiple categories of media programs, with the media programs being grouped (e.g., into rows) by category.

Media programs may be selected for inclusion in a menu of media programs represented in media menu tray 508 based on any suitable criteria. For example, in response to a user request to launch media menu tray 508, a set of media programs to be represented in the media menu tray 508 may be selected from one or more libraries of media programs based on one or more criteria. To illustrate one example, the selection may be based on metadata associated with a media program currently being played back when the user request is received. Accordingly, one or more media programs that share one or more attributes of the currently playing media program may be selected for representation in media menu tray 508.

Additionally or alternatively, a selection may be based on a distribution schedule of media programs. For example, one or more media programs that are currently being distributed, are about to be distributed (e.g., will begin to be distributed within a predefined amount of time or at the start of a next sequential time slot), and/or have been recently distributed (e.g., were distributed within a predefined amount of time such as up to three days ago) in accordance with a media-provider-defined media distribution schedule may be selected. In FIG. 5, for example, media menu tray 508 may represent scheduled-type media programs that include at least one of a media program currently being distributed in accordance with the media-provider-defined media program distribution schedule, a media program about to be distributed in accordance with the media-provider-defined media program distribution schedule, and a media program recently distributed in accordance with the media-provider-defined media program distribution schedule.

In certain examples, the media program that was recently distributed in accordance with the schedule may be made available by the media service provider. For example, a system of the media service provider (e.g., system 202) may record the media program while the media program is distributed in accordance with the schedule and maintain and make a copy of the recording available for user access for a predetermined length of time such as up to three days after the scheduled distribution of the media program. This may allow the recently distributed media program to be made available for user access for an extended period of time as part of the media service.

Media menu tray 508 may include a graphical object indicating a particular category of media programs represented in media menu tray 508. In FIG. 5, for example, media menu tray 508 includes a graphical object 522 positioned at an end of a row of graphical objects representing the menu of media programs. As shown, graphical object 522 indicates that the media programs represented in media menu tray 508 are associated with a category labeled "TV Shows," which category may include media programs distributed by a media service provider in accordance with a television programming schedule.

Graphical object 522 may be selectable by a user to launch another graphical user interface view, such as a television program guide user interface view, for display by display device 504. In some examples, the television program guide user interface view may represent a set of television programs and/or related features that are more robust than the collection and/or features in media menu tray 508.

As mentioned, GUI view 500 is not personalized to a specific user. For example, GUI view 500 may not include any content selected based on the specific user. GUI view 500 may include content selected for inclusion in GUI view 500 based on one or more other criteria not specific to the user. For example, content may be selected for inclusion in GUI view 500 based on an account with media service 204, which may be under a primary account holder's name but not limited to being accessed by only the primary account holder. For example, one or more other members of the primary account holder's household may access media service 204 through the account. As another example, content may be selected for inclusion in GUI view 500 based on a media service access device through which media service 204 is being accessed. For instance, content of GUI view 500 may be selected based on one or more attributes of the media service access device through which media service 204 is being accessed.

GUI view 500 may be provided for display by shared media service access device 206 when operating in accordance with a shared mode of operation. During operation in accordance with the shared mode of operation, personalization facility 102 may direct shared media service access device 206 to switch to operating in accordance with a personal mode of operation. Shared media service access device 206 may respond by switching from operating in accordance with the shared mode of operation to operating in accordance with the personal mode of operation, which may include providing a personalized GUI view instead of GUI view 500 for display.

FIG. 6 shows a GUI view 600 that is personalized to a specific user. GUI view 600 is similar to GUI view 500 except that media menu tray user interface content in media menu tray 508 is selected for inclusion in media menu tray 508 based on a specific user. For example, media menu tray 508 may include a set of one or more user-selectable graphical objects (e.g., cover art thumbnail images) representing a menu of one or more media programs, at least some of which have been selected for inclusion in the menu based on the specific user.

In the example illustrated in FIG. 6, for example, media menu tray 508 represents media programs included in a watch list for a specific user. The watch list may be specific to the user and may have been formed over time based on interaction of the user with media service 204. For example, the watch list may include media programs that have been purchased by the user, rented by the user, partially consumed by the user (as visually indicated by progress bar icons in GUI view 600), bookmarked by the user as being of interest to the user, and/or otherwise interacted with by the user. In certain examples, the watch list may include media programs that have been automatically curated, by personalization facility 102 for example, based on information about the user.

Media menu tray 508 may include a graphical object indicating that media menu tray 508 represents a watch list of a user. In FIG. 6, for example, graphical object 602 indicates that the media programs represented in media menu tray 508 are included in a watch list of a specific user. Graphical object 602 may be selectable by a user to launch another graphical user interface view, such as a watch list view, for display by display device 504. In some examples, the watch list view may represent an entire set of media programs and/or related features that are more robust than the watch list collection and/or features in media menu tray 508.

The example of a personalized GUI view 600 shown in FIG. 6 is illustrative only. A media service user interface may be personalized to a specific user in any additional or alternative ways. For example, any attributes of a media service user interface, such as a skin, a theme, and/or a visual indicator for a user may be modified to indicate that the media service user interface is personalized to the specific user.

In certain examples, personalization facility 102 may personalize and/or refrain from personalizing media service 204 by personalizing and/or refraining from personalizing a tracking of interactions with the media service 204. For example, personalization facility 102 may direct shared media service access device 206 to operate in accordance with a shared mode of operation to not personalize tracking of interactions with the media service 204, such as by not attributing interactions with the media service 204 to a specific user. Alternatively, personalization facility 102 may direct shared media service access device 206 to operate in accordance with a personal mode of operation to personalize tracking of interactions with the media service 204, such as by attributing interactions with the media service 204 to a specific user.

To illustrate, when shared media service access device 206 operates in accordance with the shared mode of operations, personalization facility 102 may refrain from tracking interactions with media service 204 through shared media service access device 206 and/or from attributing tracked interactions with media service 204 to a specific user. For example, personalization facility 102 may track interactions with media service 204 through shared media service access device 206 and attribute the tracked interactions generally to shared media service access device 206 (e.g., a device profile for shared media service access device 206) and/or an account with media service 204 without attributing the tracked interactions to a specific user.

Alternatively, when shared media service access device 206 operates in accordance with the personal mode of operations, personalization facility 102 may track interactions with media service 204 through shared media service access device 206 and/or attribute the tracked interactions with media service 204 to a specific user. For example, personalization facility 102 may track interactions with media service 204 through shared media service access device 206 and attribute the tracked interactions to a specific user, such as by creating and/or updating a user profile for the user based on the tracked interactions with media service 204 through shared media service access device 206.

Figure 7:
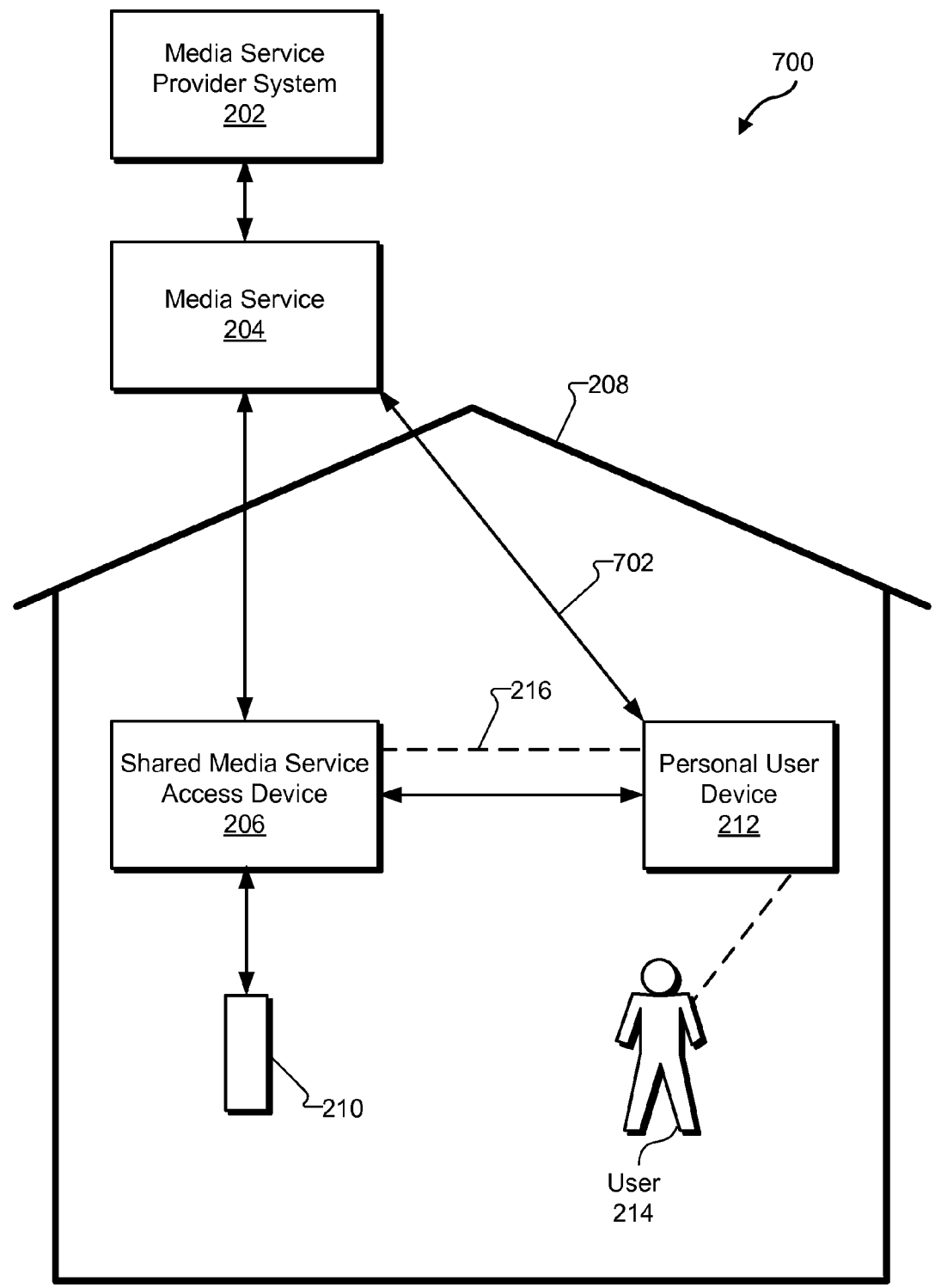
FIGS. 7-8 illustrate exemplary implementations of the system of FIG. 1 according to principles described herein.

In certain examples, an end user of a media service may utilize multiple media service access devices to access the media service. For example, FIG. 7 illustrates an implementation 700 similar to implementation 200 and in which personal user device 212 is a personal media service access device configured to access media service 204. Personal user device 212 may access media service 204 independently of any other media service access devices, including shared media service access device 206. Arrow 702 represents the capability of personal user device 212 to access media service 204. While FIG. 7 illustrates personal user device 212 to be located within customer premises 208, this is illustrative only. Personal user device 212 may be used by user 214 to access media service 204 from any suitable location, which may include any suitable location internal or external to customer premises 208.

Personalization facility 102 may be configured to track interactions with media service 204 by way of personal user device 212 and attribute the tracked interactions to user 214. For example, personalization facility 102 may use the tracked interactions to update a user profile maintained for user 214. To illustrate one example, user 214 may utilize personal user device 212 to access and consume a particular media program through media service 204. Personalization facility 102 may update the user profile for the user 214 based on this interaction with media service 204. Personalization facility 102 may track interactions of personal user device 212 with media service 204 whether or not personal user device 212 is communicatively connected to shared media service access device 206.

Personalization facility 102 may be configured to utilize information associated with interactions with media service 204 by way of personal user device 212 to personalize media service 204 to user 214 when media service 204 is accessed by way of personal user device 212. This may include personalization facility 102 directing personal user device 212 to perform any of the exemplary personalization operations described herein to personalize media service 204 to user 214. For example, personalization facility 102 may direct personal user device 212 to personalize a media service user interface to user 214.

Personalization facility 102 may be configured to utilize information associated with interactions with media service 204 by way of personal user device 212 to selectively personalize media service 204 to user 214 when media service 204 is accessed by way of shared media service access device 206. For example, personalization facility 102 may determine that personal user device 212 is being used to interact with shared media service access device 206 and, in response, may direct shared media service access device 206 to personalize media service 204 to user 214. This may include personalization facility 102 directing shared media service access device 206 to perform any of the exemplary personalization operations described herein to personalize media service 204 to user 214. For example, personalization facility 102 may direct shared media service access device 206 to personalize a media service user interface to user 214.

In this or a similar manner, shared media service access device 206 may personalize media service 204 to user 214 when personal user device 212 is used by user 214 to interact with media service 204 and may base the personalization on tracked user interactions with media service 204 by way of personal user device 212 (e.g., by basing the personalization on a user profile for user 214, which has been created and/or updated based at least in part on the tracked user interactions with media service 204 by way of personal user device 212).

In certain examples, a user of a personal media service access device may bring the personal media service access device to a location associated with another end user of media service 204, such as to customer premises 208. The user may utilize the personal media service access device to interact with a shared media service access device, such as shared media service access device 206 at customer premises 208.

Figure 8:
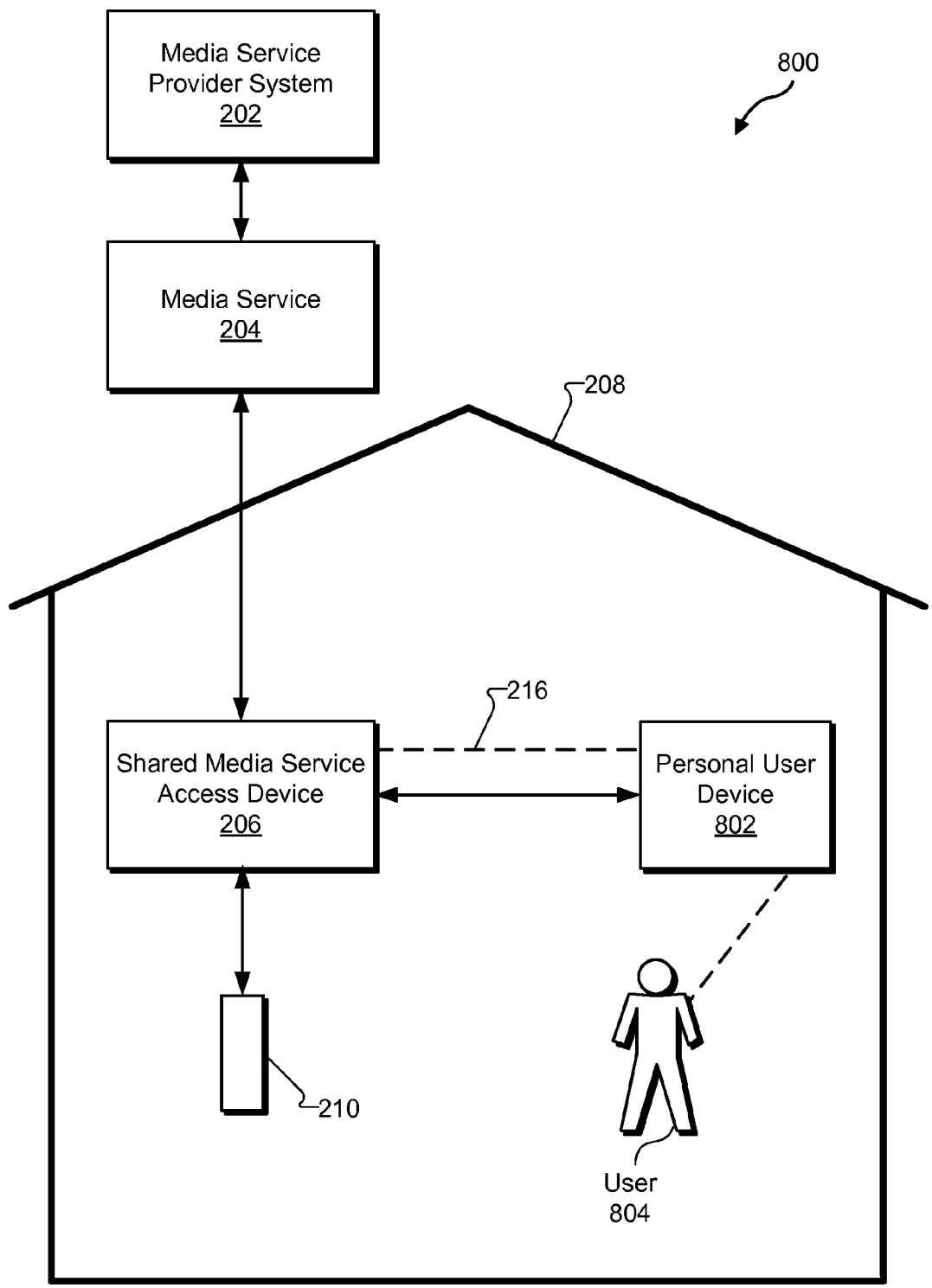

For example, FIG. 8 illustrates an implementation 800 that is similar to implementation 200 except that a different personal user device 802 specific to a different user 804 is located within customer premises 208 and in communication with shared media service access device 206. Such a scenario may occur when user 804 visits user 214 at customer premises 208, for example.

Both user 214 and user 804 may be end users of media service 204. When personal user device 212 specific to user 214 is used to interact with media service 204 by way of shared media service access device 206, personalization facility 102 may personalize media service 204 to user 214 in any of the ways described herein (e.g., based on a user profile for user 214). Alternatively, when personal user device 802 specific to user 804 is used to interact with media service 204 by way of shared media service access device 206, personalization facility 102 may personalize media service 204 to user 804 in any of the ways described herein (e.g., based on a user profile for user 804). Accordingly, user 804 may utilize personal user device 802 to access media service 204 personalized to him or her through any shared media service access device, including a shared media service access device that is not otherwise associated with user 804.

To illustrate, user 804 may visit user 214 at customer premises 208. During the visit, user 804 may start a remote control session between personal user device 802 and shared media service access device 206. While the remote control session is active, media service 204 may be personalized to user 804. For example, shared media service access device 206 may provide a media service user interface that is personalized to user 804. For instance, GUI view 600 may be displayed and may include content representing a watch list of user 804. In this or a similar manner, personal user device 802 that is specific to user 804 may be leveraged to personalize media service 204 accessed through shared media service access device 206 to user 804.

Figure 9:
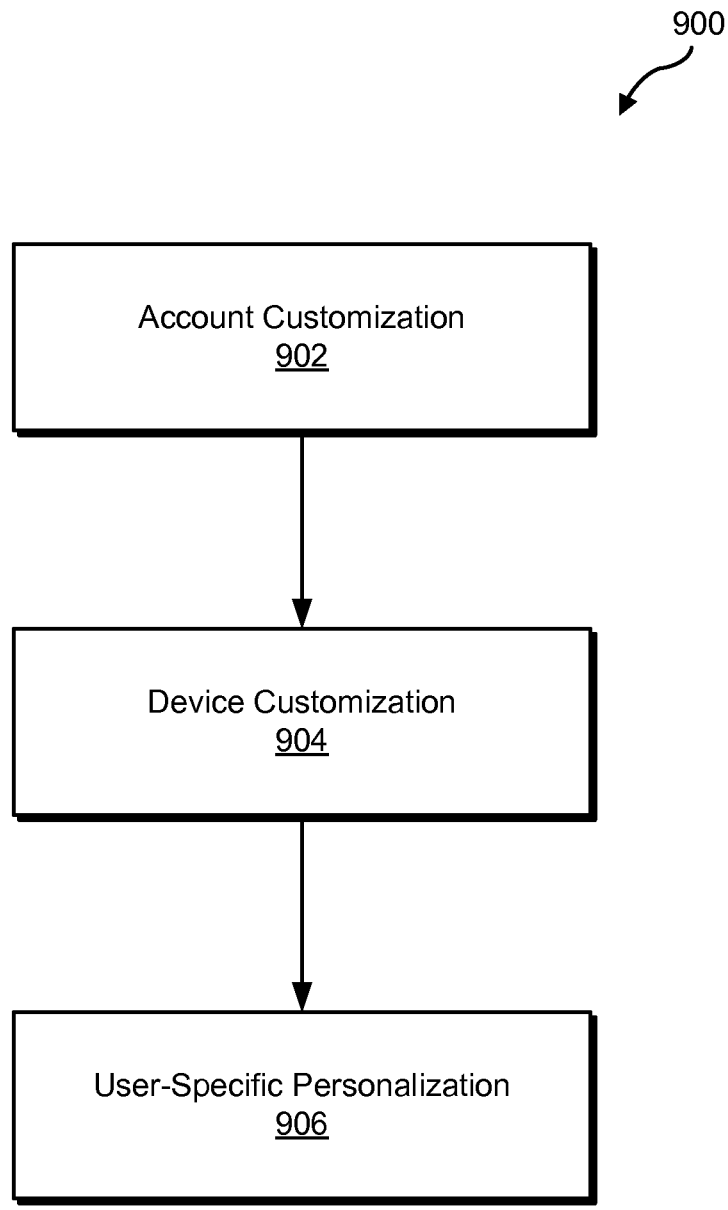
FIG. 9 illustrates an exemplary tiered media service customization configuration according to principles described herein.

In certain examples, a media service may undergo multiple tiers of customization to produce a customized user experience. The selective personalization of the media service described herein may be one of the tiers of customization. For example, FIG. 9 illustrates an exemplary tiered customization 900 of a media service. As shown, the tiered customization 900 may include an account customization 902, a device customization 904, and a user-specific personalization 906. Personalization facility 102 may perform operations for the user-specific personalization 906 as described herein. In certain examples, personalization facility 102 may perform one or more operations associated with account customization 902 and/or device customization 904.

Account customization 902 may include the performance of one or more operations to customize a media service based on an account with the media service (also referred to as a "media service account" or a "service account"). For example, a subscriber may establish a subscription account to access certain features and/or content of the media service. The subscription account may govern which set of features and/or content are accessible to the subscriber. To illustrate, a subscription account with a subscriber television service may indicate a particular subscription package of features and/or content to which the subscriber is granted access.

The media service may be customized based on the service account in any suitable way. For example, a media service user interface may be customized to include user interface content that is specific to the service account, such as by representing only features and/or content accessible through the service account. For instance, if a subscriber television service account has access to a premier source of content (e.g., HBO), a user interface may reflect that the premier source of content is available for access. Alternatively, if a different subscriber television service account does not have access to the premier source of content, a user interface may not reflect that the premier source of content is available for access.

Device customization 904 may include the performance of one or more operations to customize a media service based on a media service access device being used to access the media service. For example, a media service user interface, content, and/or features of the media service may be customized based on one or more attributes of a media service access device through which the media service is being accessed.

User-specific personalization 906 may include the performance of one or more operations to personalize a media service to a specific user. Personalization facility 102 may perform any such operations, such as described herein, to personalize the media service to a specific user.

Any combination or sub-combination of account customization 902, device customization 904, and user-specific personalization 906 may be performed to customize a media service. For example, user-specific personalization 906 may be performed in conjunction with and/or following either or both of account customization 902 and device customization 904 in a tiered customization configuration. To illustrate one example, when user 214 uses personal user device 212 to interact with shared media service access device 206 to access media service 204 through shared media service access device 206, media service 204 may be customized based on an account associated with user 214 and/or shared media service access device 206, one or more attributes of shared media service access device 206, and/or a user profile for user 214.

In other examples, the service account and user profile used to customize media service 204 may be associated with different end users of media service 204. For example, user 804 may visit user 214 at customer premises 208 as shown in FIG. 8 and may use personal user device 802 to interact with shared media service access device 206 to access media service 204 through shared media service access device 206. In this scenario, media service 204 may be customized based on either an a service account associated with user 804 or a service account associated with user 214 and/or shared media service access device 206, one or more attributes of shared media service access device 206, and/or a user profile for user 804.

Whether the customization is based on the service account associated with user 214 or the service account associated with user 804 may be determined in any suitable way. For example, a provider of the media service and/or an end user of the media service may define a setting indicating which service account to use in such a scenario. As another example, service accounts may be prioritized in accordance with attributes of the service accounts, and the customization may select one of the service accounts to use based on the prioritization. As another example, end users of media service 204 may be prioritized, and the customization may select the service account of one of the users to use based on the prioritization.

To illustrate one example, a service account associated with user 214 and/or shared media service access device 206 may grant access to HBO, but a service account associated with user 804 may not grant access to HBO. When user 804 visits customer premises 208 and uses personal user device 802 to interact with shared media service access device 206 to access media service 204 through shared media service access device 206, media service 204 may be customized based on a combination of the user profile for user 804 and the service account associated with user 214 and/or shared media service access device 206. For example, the media service 204 may be customized to provide access to HBO based on the service account associated with user 214 and/or shared media service access device 206 and may in addition be personalized to user 804. Alternatively, media service 204 may be customized based on a combination of the user profile for user 804 and the service account associated with user 804. For example, the media service 204 may be customized not to provide access to HBO based on the service account associated with user 804 and may in addition be personalized to user 804.

To illustrate another example, a service account associated with user 214 and/or shared media service access device 206 may not grant access to HBO, but a service account associated with user 804 may grant access to HBO. When user 804 uses visits customer premises 208 and uses personal user device 802 to interact with shared media service access device 206 to access media service 204 through shared media service access device 206, media service 204 may be customized based on a combination of the user profile for user 804 and the service account associated with user 804. For example, media service 204 may be customized to provide access to HBO based on the service account associated with user 804 (even though shared media service access device 206 is otherwise associated with a service account of user 214 that does not grant access to HBO) and may in addition be personalized to user 804. Alternatively, media service 204 may be customized based on a combination of the user profile for user 804 and the service account associated with user 214 and/or shared media service access device 206. For example, media service 204 may be customized not to provide access to HBO based on the service account associated with user 214 and/or shared media service access device 206 and may in addition be personalized to user 804.

Such multiuser-scenario-based customizations may include performance of any suitable operations to customize media service 804. For example, one or more operations may be performed by personalization facility 102 to customize a media service user interface. To illustrate, personalization facility 102 may direct shared media service access device 206 to personalize a media service user interface to user 804. If a watch list of user 804, for example, includes a media program distributed by way of HBO, the watch list represented in a media service user interface view provided by shared media service access device 206 for display with the HBO media program either included or omitted as selectively determined by personalization facility 102 (e.g., based on whether the service account associated with user 804 or the service account associated with user 214 and/or shared media service access device 206 is used for customization).

Figure 10:
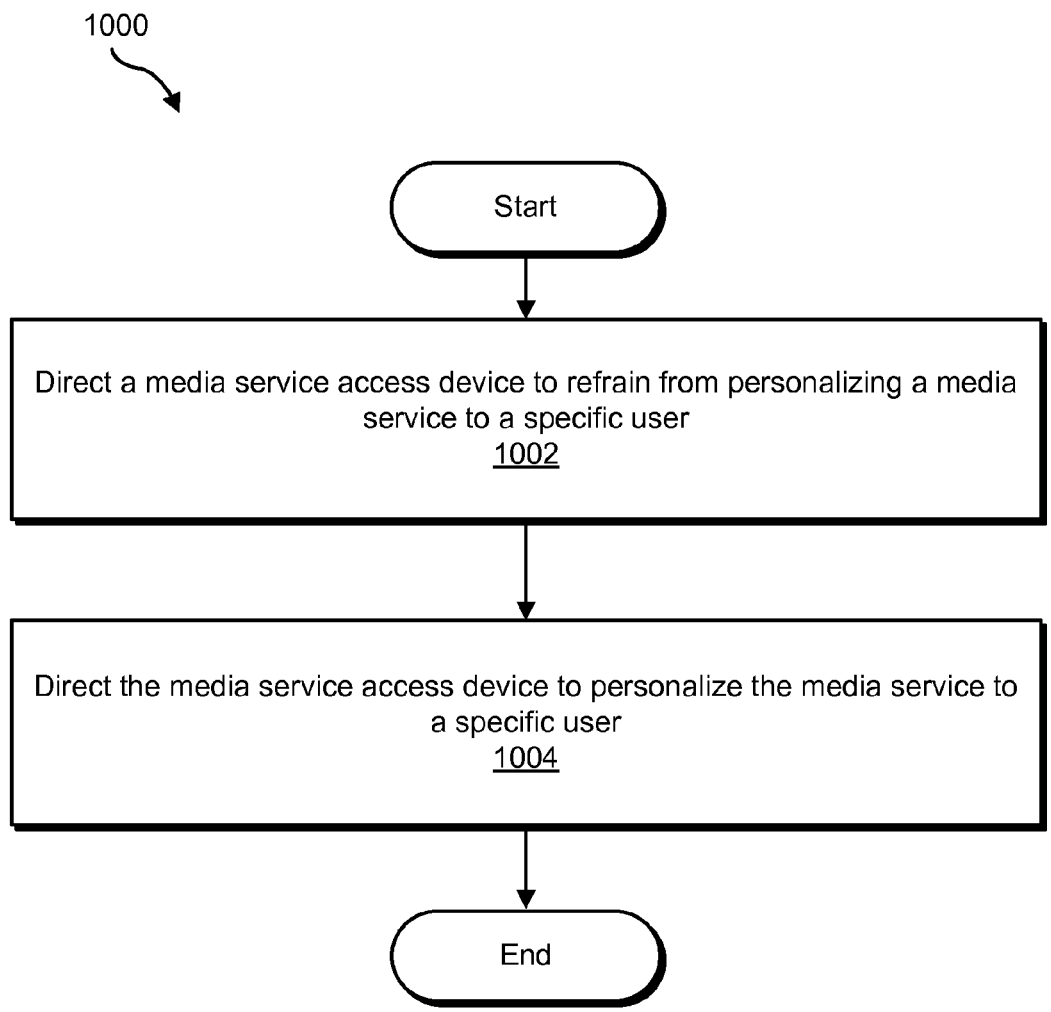
FIGS. 10-11 illustrate exemplary media service personalization methods according to principles described herein.
Figure 11:
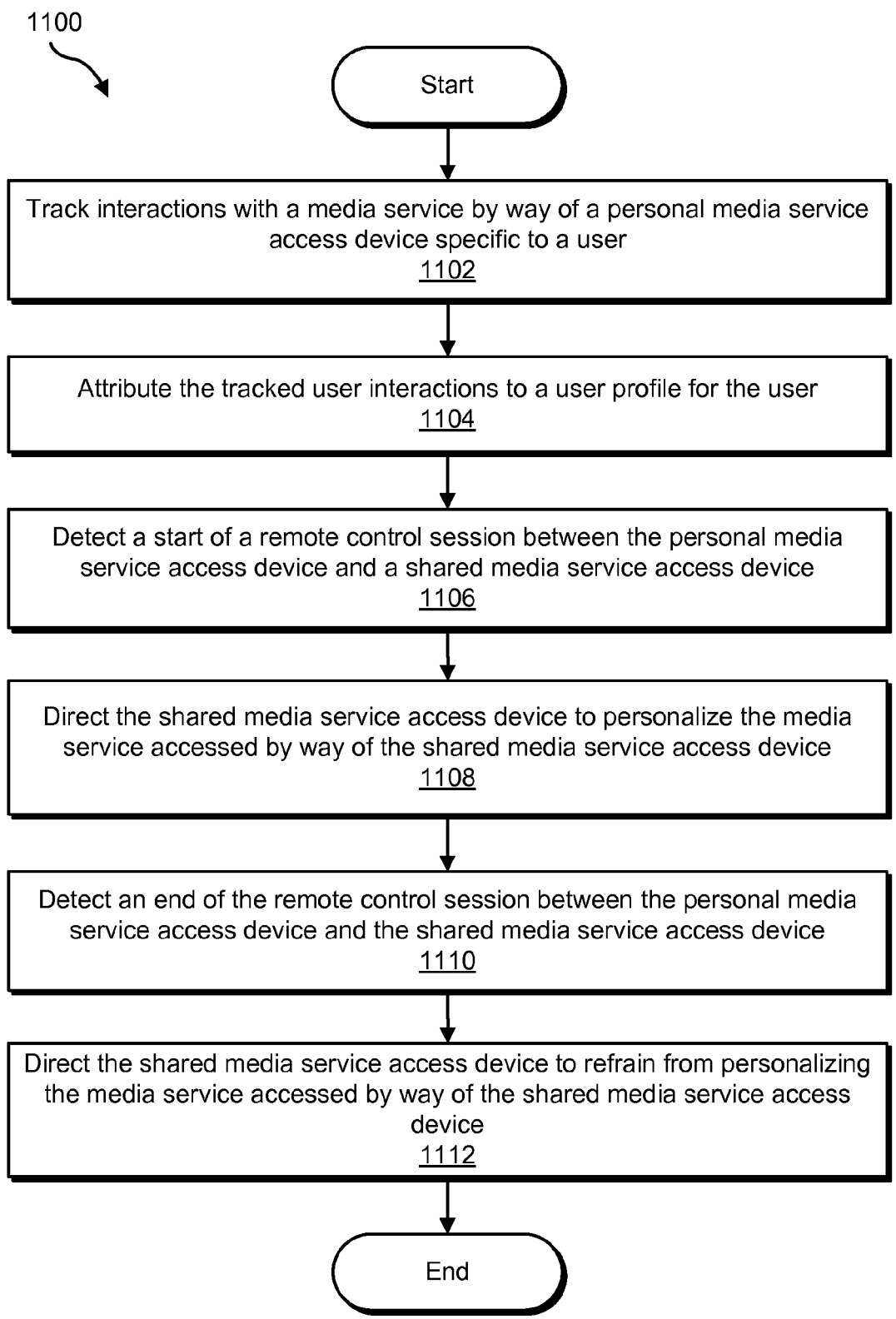

FIGS. 10-11 illustrate exemplary media service personalization methods 1000-1100 according to principles described herein. While FIGS. 10-11 illustrate exemplary steps according to certain embodiments, other embodiments may omit, add to, reorder, combine, and/or modify any of the steps shown in FIGS. 10-11. In certain embodiments, one or more of the steps shown in FIGS. 10-11 may be performed by system 100 and/or one or more components or implementations of system 100, such as by a computing device implementing system 100.

In step 1002 of method 1000, a media service personalization system (e.g., system 100) directs a media service access device to refrain from personalizing a media service to a specific user. Step 1002 may be performed in any of the ways described herein. For example, the media service personalization system may direct the media service access device to refrain from personalizing the media service to a specific user when user input is received in a particular way, such as by way of a shared user input device. For instance, the media service personalization system may direct the media service access device to operate in accordance with a shared mode of operation when user interaction with the media service access device is by way of a shared user input device, such as described herein.

In step 1004 of method 1000, the media service personalization system 100 directs the media service access device to personalize the media service to a specific user. Step 1004 may be performed in any of the ways described herein. For example, the media service personalization system may direct the media service access device to personalize the media service to a specific user when user input is received in another particular way, such as by way of a personal device specific to the user. For instance, the media service personalization system may direct the media service access device to operate in accordance with a personal mode of operation when user interaction with the media service access device is by way of a personal device specific to a user, such as described herein.

The media service personalization system may switch between performing step 1002 and performing step 1004 in any of the ways described herein. For example, the media service personalization system may perform step 1002 in response to a detection of a start of a remote control session between the personal device and the media service access device and may perform step 1004 in response to a detection of an end of the remote control session between the personal device and the media service access device, such as described herein.

During operation in accordance with the shared mode of operation, the media service may not be personalized to a specific user in any of the ways described herein. During operation in accordance with the personal mode of operation, the media service may be personalized to a specific user in any of the ways described herein.

In step 1102 of method 1100, a media service personalization system (e.g., system 100) tracks interactions with a media service by way of a personal media service access device specific to a user. Step 1102 may be performed in any suitable way, including by system 100 monitoring and/or receiving data representative of the interactions from any suitable source.

In step 1104 of method 1100, the media service personalization system attributes the tracked interactions with the media service through the personal media service access device to the user. Step 1104 may be performed in any suitable way, including by system 100 attributing the tracked interactions to a user profile for the user.

In step 1106 of method 1100, the media service personalization system detects a start of a remote control session between the personal media service access device and a shared media service access device. Step 1106 may be performed in any suitable way, including by system 100 detecting an occurrence of one or more events predefined to indicate a start of a remote control session.

In step 1108 of method 1100, the system directs the shared media service access device to personalize the media service accessed by way of the shared media service access device to the user. Step 1108 may be performed in response to the start of the remote control session detected in step 1106 and in any of the ways described herein, including by basing the personalization on the user profile for the user.

In step 1110 of method 1100, the media service personalization system detects an end of the remote control session between the personal media service access device and a shared media service access device. Step 1110 may be performed in any suitable way, including by system 100 detecting an occurrence of one or more events predefined to indicate an end of a remote control session.

In step 1112 of method 1100, the system directs the shared media service access device to refrain from personalizing the media service accessed by way of the shared media service access device to the user. Step 1112 may be performed in response to the end of the remote control session detected in step 1110 and in any of the ways described herein, including by refraining from personalizing the media service based on the user profile for the user.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a physical computer processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 12:
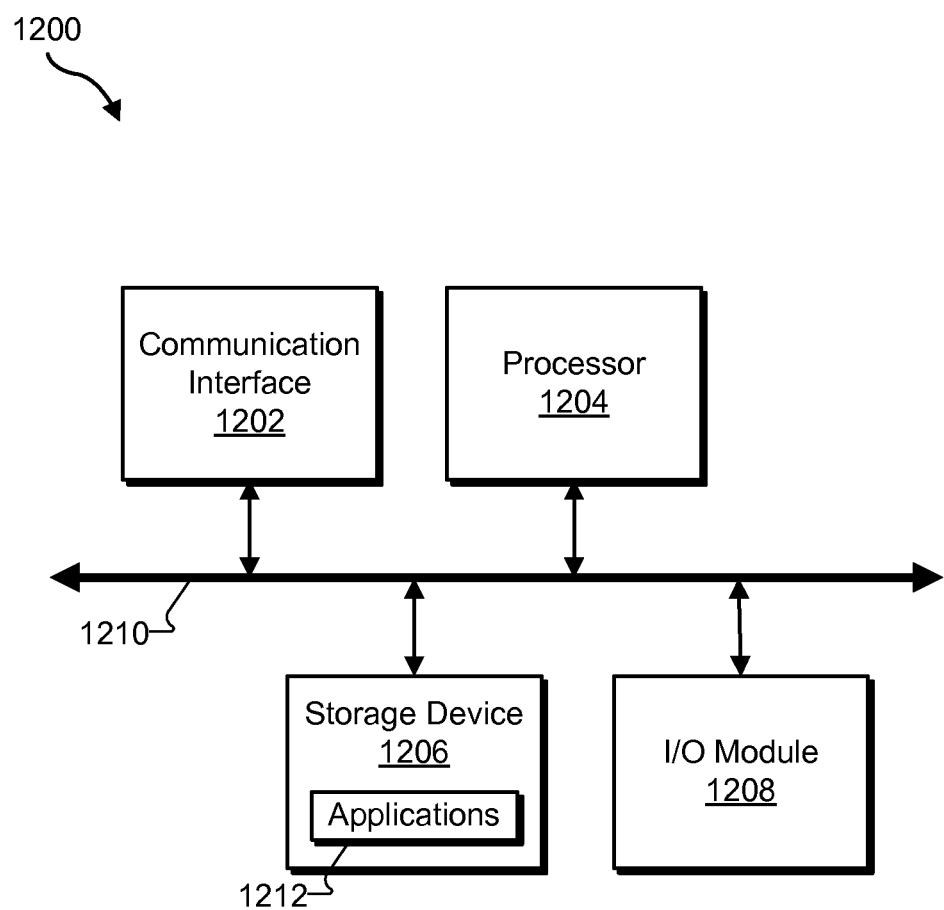
FIG. 12 illustrates an exemplary computing device according to principles described herein.

FIG. 12 illustrates an exemplary computing device 1200 that may be configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a communications medium interface, a modem, and any other suitable interface. Communication interface 1202 may be configured to interface with any suitable communication media, protocols, and formats, including any of those mentioned above.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1206. For example, data representative of one or more executable applications 1212 (which may include, but are not limited to, one or more of the software applications configured to direct processor 1204 to perform any of the operations described herein may be stored within storage device 1206.

I/O module 1208 may be configured to receive user input and provide user output and may include any hardware, firmware, software, or combination thereof supportive of input and output capabilities. For example, I/O module 1208 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with personalization facility 102. Likewise, storage facility 104 may be implemented by or within storage device 1206. In such implementations, system 100 may be referred to as a computer-implemented system 100.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    directing, by a media service personalization system, a media service access device associated with a first account with a media service to operate in accordance with a shared mode of operation when user interaction with the media service access device is by way of a shared user input device;
    directing, by the media service personalization system, the media service access device to operate in accordance with a personal mode of operation when user interaction with the media service access device is by way of a personal device specific to a user associated with a second account with the media service, the directing the media service access device to operate in accordance with the personal mode of operation comprising
        determining that the media service is subject to a plurality of tiers of customization, the plurality of tiers of customization including an account customization tier, a device customization tier, and a user-specific personalization tier, and directing the media service access device to customize the media service accessed by way of the media service access device to be personalized to the user associated with the second account by performing one or more customization operations for the user-specific personalization tier, the one or more customization operations for the user-specific personalization tier performed after and in combination with one or more customization operations for the account customization tier and one or more customization operations for the device customization tier, the media service customized based on a user profile for the user associated with the second account with the media service and on the first account with the media service;

switching, by the media service personalization system, from the directing the media service access device to operate in accordance with the shared mode of operation to the directing the media service access device to operate in accordance with the personal mode of operation in response to a detected start of a remote control session between the personal device and the media service access device;

detecting, by the media service personalization system, an end of the remote control session by detecting a lack of user interaction with the media service access device by way of the personal device for a predefined length of time and a change in a geographic location of the personal device relative to the media service access device; and directing, by the media service personalization system in response to the detecting of the end of the remote control session, the media service access device to refrain from using the user profile for the user associated with the second account with the media service to customize the media service accessed by way of the media service access device.

2. The method of claim 1, further comprising switching, by the media service personalization system, from the directing the media service access device to operate in accordance with the personal mode of operation back to the directing the media service access device to operate in accordance with the shared mode of operation in response to the detecting of the end of the remote control session between the personal device and the media service access device.

3. The method of claim 2, wherein the detecting of the end of the remote control session between the personal device and the media service access device further comprises detecting at least one of a user interface timeout and a start of a remote control session between the shared user input device and the media service access device.

4. The method of claim 1, wherein:
the directing the media service access device to operate in accordance with the shared mode of operation comprises directing the media service access device to refrain from personalizing a media service user interface to the user; and
the directing the media service access device to operate in accordance with the personal mode of operation further comprises directing the media service access device to personalize the media service user interface to the user.

5. The method of claim 4, wherein:
the directing the media service access device to refrain from personalizing the media service user interface to the user comprises providing a non-personalized view of the media service user interface that includes a menu of media programs not personalized to the user; and
the directing the media service access device to personalize the media service user interface to the user comprises providing a personalized view of the media service user interface that includes a menu of media programs personalized to the user.

6. The method of claim 5, wherein the menu of media programs personalized to the user comprises a watch list of the user.

7. The method of claim 1, wherein:
the directing the media service access device to operate in accordance with the shared mode of operation comprises directing the media service access device to refrain from attributing an interaction with the media service by way of the media service access device to the user; and
the directing the media service access device to operate in accordance with the personal mode of operation further comprises directing the media service access device to attribute an interaction with the media service by way of the media service access device to the user.

8. The method of claim 1, wherein:
the media service access device comprises a set-top box device located at a customer premises; and
the personal device comprises a mobile device of the user.

9. The method of claim 1, embodied as computer-executable instructions on at least one non-transitory computer-readable medium.

10. The method of claim 1, wherein:
the one or more customization operations for the account customization tier are performed first;
the one or more customization operations for the device customization tier are performed second; and
the one or more customization operations for the user-specific personalization tier are performed third.

11. A method comprising:
tracking, by a media service personalization system, interactions with a media service by way of a personal media service access device specific to a user associated with a first account with the media service;
attributing, by the media service personalization system, the tracked user interactions to a user profile for the user;
detecting, by the media service personalization system, a start of a remote control session between the personal media service access device specific to the user associated with the first account with the media service and a shared media service access device associated with a second account with the media service;
determining, by the media service personalization system, that the media service is subject to a plurality of tiers of customization, the plurality of tiers of customization including an account customization tier, a device customization tier, and a user-specific personalization tier;
directing, by the media service personalization system in response to the detecting of the start of the remote control session between the personal media service access device and the shared media service access device, the shared media service access device to customize the media service accessed by way of the shared media service access device to be personalized to the user associated with the second account by performing one or more customization operations for the user-specific personalization tier, the one or more customization operations for the user-specific personalization tier performed after and in combination with one or more customization operations for the account customization tier and one or more customization operations for the device customization tier, the media service customized based on the user profile for the user associated with the first account with the media service and on the second account with the media service;

detecting, by the media service personalization system, an end of the remote control session by detecting a lack of user interaction with the shared media service access device by way of the personal media service access device for a predefined length of time and a change in a geographic location of the personal media service access device relative to the shared media service access device; and directing, by the media service personalization system in response to the detecting of the end of the remote control session, the shared media service access device to refrain from using the user profile for the user associated with the first account with the media service to customize the media service accessed by way of the shared media service access device.

12. The method of claim 11, wherein the directing the shared media service access device to customize the media service accessed by way of the shared media service access device comprises directing the shared media service access device to personalize a media service user interface based on the user profile for the user associated with the first account with the media service.

13. The method of claim 11, wherein the directing the shared media service access device to customize the media service accessed by way of the shared media service access device comprises directing the shared media service access device to attribute an interaction with the media service by way of the shared media service access device to the user profile for the user associated with the first account with the media service.

14. The method of claim 11, embodied as computer-executable instructions on at least one non-transitory computer-readable medium.

15. A system comprising:
at least one physical computing device that:
directs a media service access device associated with a first account with a media service to operate in accordance with a shared mode of operation when user interaction with the media service access device is by way of a shared user input device;
directs the media service access device to operate in accordance with a personal mode of operation when user interaction with the media service access device is by way of a personal device specific to a user associated with a second account with the media service, the at least one physical computing device directing the media service access device to operate in accordance with the personal mode of operation by
directing the media service access device to determine that the media service is subject to a plurality of tiers of customization, the plurality of tiers of customization including an account customization tier, a device customization tier, and a user-specific personalization tier, and
directing the media service access device to customize the media service accessed by way of the media service access device to be personalized to the user associated with the second account by performing one or more customization operations for the user-specific personalization tier, the one or more customization operations for the user-specific personalization tier performed after and in combination with one or more customization operations for the account customization tier and one or more customization operations for the device customization tier, the media service customized based on a user profile for the user associated with the second account with the media service and on the first account with the media service;

switches from the directing the media service access device to operate in accordance with the shared mode of operation to the directing the media service access device to operate in accordance with the personal mode of operation in response to a detected start of a remote control session between the personal device and the media service access device;

detects an end of the remote control session by detecting a lack of user interaction with the media service access device by way of the personal device for a predefined length of time and a change in a geographic location of the personal device relative to the media service access device; and directs, in response to the detected end of the remote control session, the media service access device to refrain from using the user profile for the user associated with the second account with the media service to customize the media service accessed by way of the media service access device.

16. The system of claim 15, wherein the at least one physical computing device switches from the directing the media service access device to operate in accordance with the personal mode of operation back to the directing the media service access device to operate in accordance with the shared mode of operation in response to the detected end of the remote control session between the personal device and the media service access device.

17. The system of claim 15, wherein:
the at least one physical computing device directs the media service access device to operate in accordance with the shared mode of operation by directing the media service access device to refrain from personalizing a media service user interface to the user; and
the at least one physical computing device further directs the media service access device to operate in accordance with the personal mode of operation by directing the media service access device to personalize the media service user interface to the user.

18. The system of claim 15, wherein:
the at least one physical computing device directs the media service access device to operate in accordance with the shared mode of operation by directing the media service access device to refrain from attributing an interaction with the media service by way of the media service access device to the user; and
the at least one physical computing device further directs the media service access device to operate in accordance with the personal mode of operation by directing the media service access device to attribute an interaction with the media service by way of the media service access device to the user.

* * * * *